United States Patent [19]

Woolf

[11] Patent Number: 5,572,371

[45] Date of Patent: Nov. 5, 1996

[54] VIEWER ASSEMBLIES AND VIEWABLE MATERIAL ADAPTED THERETO

[75] Inventor: Jeffrey M. Woolf, London, Great Britain

[73] Assignee: Micromap Limited, England

[21] Appl. No.: 162,177

[22] PCT Filed: Jun. 15, 1992

[86] PCT No.: PCT/GB92/01072

§ 371 Date: Jan. 10, 1994

§ 102(e) Date: Jan. 10, 1994

[87] PCT Pub. No.: WO92/22885

PCT Pub. Date: Dec. 3, 1992

[30] Foreign Application Priority Data

Jun. 14, 1991 [GB] United Kingdom ............ 9112821

[51] Int. Cl.⁶ ..................................... G02B 27/02
[52] U.S. Cl. ..................... 359/802; 359/801; 359/803
[58] Field of Search ............... 359/798, 800, 359/801, 802, 803, 804, 807, 810

[56] References Cited

U.S. PATENT DOCUMENTS

| | | | |
|---|---|---|---|
| 632,026 | 8/1899 | Smith | 359/807 |
| 745,605 | 12/1903 | Hattrem | 359/807 |
| 1,957,716 | 5/1934 | Koster | 359/804 |
| 1,989,454 | 1/1935 | Koster | 359/804 |
| 2,580,164 | 12/1951 | Flynn | 359/804 |
| 2,601,619 | 6/1952 | Loomis | 359/804 |
| 3,000,123 | 9/1961 | Hicks | 359/803 |
| 3,076,276 | 2/1963 | Pitchford | 359/804 |
| 3,438,698 | 4/1969 | Triggs | 359/803 |
| 4,037,939 | 7/1977 | Latady | 350/241 |
| 4,149,783 | 4/1979 | Latady | 353/11 |
| 4,568,148 | 2/1986 | Onanian | 359/807 |
| 4,594,788 | 6/1986 | Aberger | 359/801 |
| 4,881,334 | 11/1989 | Brown | 40/365 |

FOREIGN PATENT DOCUMENTS

| | | | |
|---|---|---|---|
| 609878 | 12/1960 | Canada | 359/802 |
| 1032498 | 7/1953 | France | 359/801 |
| 1098179 | 7/1955 | France | 359/801 |
| 1339816 | 9/1963 | France . | |
| 809722 | 8/1951 | Germany . | |
| 2935220A1 | 3/1981 | Germany . | |
| 3245427A1 | 7/1983 | Germany . | |
| 3630436 | 3/1988 | Germany . | |
| 370096A1 | 7/1988 | Germany . | |
| 3712616 | 10/1988 | Germany | 359/804 |
| 600954 | 4/1948 | United Kingdom . | |
| 1272266 | 4/1972 | United Kingdom . | |
| 1360971 | 7/1974 | United Kingdom . | |
| 1531731 | 11/1978 | United Kingdom | 359/804 |
| 2070273 | 9/1981 | United Kingdom . | |

*Primary Examiner*—Georgia Y. Epps
*Assistant Examiner*—Jordan M. Schwartz
*Attorney, Agent, or Firm*—Ostrolenk, Faber, Gerb & Soffen, LLP

[57] ABSTRACT

A magnified viewer capable of viewing an information card or sheet supported on a support base of the viewer. The viewer includes a magnifying lens supported above the support base by means of two oppositely disposed side portions. The side portions are each attached at one end to the support base by a first set of hinges, and at their opposite ends to the magnifying lens by a second pair of hinges. Since the side portions are pivotably connected to both the support base and the viewing lens, the user of the viewer can readily scan the magnifying lens across the information card by merely tilting the side portions from one side to another.

27 Claims, 6 Drawing Sheets

VIEWER ASSEMBLIES AND VIEWABLE MATERIAL ADAPTED THERETO

This application is a 371 continuation of PCT/GB92/01072 filed Jun. 15, 1992.

BACKGROUND OF THE INVENTION

This present invention relates to assemblies of a viewer and viewable material such as maps or like visually depicted information such as route guides. It extends further for example to viewing of handbook information, charts or cable-management diagrams. For convenience the invention will be described with reference to maps.

It is commonplace to present maps, that is to say stylised area representations of a tract of terrain or complex routes, in the form of a large sheet of paper or like material covering a large area and containing a great deal of information. Typically, because of their large size these sheets are rolled or folded. If the maps are to be used indoors, for example for planning or teaching purposes, the nature of the sheet is of secondary importance since it is readily capable of being unrolled or unfolded to the extent desired to give the immediately relevant information, and kept in that state. However, very frequently maps are intended to be read out of doors as part of some sporting or other activity. For example, in addition to the maps and route guides e.g. subway guides generally utlized by tourists or other travellers, skiers need to consult piste maps, orienteers need maps of the topography and utilization of countryside, and glider pilots or partakers in like aerial sports need some form of map consultation. It is common, therefore, to provide maps at different scales and to emphasise different features. Indeed, some maps are provided as route indicators showing in a more or less elongated form the features of a desired route but not showing associated countryside (to any great extent) at either side of the route.

One problem common to the consultation of maps outdoors concerns the convenient manipulation of the maps. Typically, for example, a skier who is warmly clothed against the temperature and is wearing gloves and carrying the usual ski poles finds it difficult to open the map and fold it to the relevant part. He has to remove his gloves, and having no suitable pockets in the suit, typically hold them under one arm or in a similarly inconvenient position while he attempts to unfold and refold the map to a suitable location. If there is any sort of wind or like condition this can be a very difficult feat, and must of course be carried out again in reverse prior to actually commencing the descent. Such problems arise with hikers, orienteers, mountainers, gliders, hang-gliders, and in a wide range of other sports. Similar problems also arise in military use of maps, and the problem is compounded by the fact that the back of a conventional map is usually white in color and thus, if held up while the map is perused, is visible over long distances as a target for enemy fire.

Tourist maps also can be inconvenient for use, and their use is indicative of unfamiliarity with the locality, attracting fraud or theft.

Moreover, there is often the requirement for consultation of maps at night, using some form of torch or the like; military uses or night emergency services often require such a facility.

Other difficulties arise when using maps or charts in confined spaces e.g. underground or in cable ducting.

There is thus a requirement to provide maps or like information for occasional consultation in a convenient fashion over a range of outdoor map-using activities.

SUMMARY OF THE INVENTION

The present invention is based in part upon the realization that the area of a map normally consulted in detail during active use is not large, and is not the whole unfolded map area of a conventional map. Typically, the area consulted in detail by the user, as indicated above, is that which can be perceived when the whole of the rest of the map is folded back. Such an area, for example, is typically of a size about 15 by 25 cm up to perhaps A4 size. Map consultation typically involves consultation and scrutiny within a succession of detailed regions of about this size on the sheet.

The present invention sets out to provide a magnifying viewer for a detailed map of which the printed sheet is small enough to give a magnified image, for consultation of generally the size of a folded portion of map, as discussed above, and at a suitable apparent distance from the user. Most preferably, the viewer is so configured as to permit selective clearly and accurately magnified scrutiny of all areas of the printed sheet.

In one aspect the invention consists in an information-carrying surface and a magnifying reader assembly comprising:

(a) a surface provided with information at a relatively smaller scale but in sufficiently high detail to carry all the information content of a larger such surface on a relatively larger scale, and supported and/or held in a flat or curved viewing plane, (b) a magnifying lens supported for ready movement either generally towards the surface to an inner storage position close to the surface or away from the surface to a predetermined or selectable extent to give on viewing through the lens a perceived image generally at the relatively larger scale, as an outer viewing position, (c) the lens and/or its support at least in part constituting a protective cover for the surface when moved to the inner storage position, and/or a protective cover being provided to fit over the lens at the inner storage position. Usually the surface is a printed map, route plan or chart.

In many forms, but not every form, of the invention the assembly carries attachment means which in use maintain it in an accessible position on the body of a wearer, and which are easily manipulable to move the lens between the two positions, e.g. by using a gloved hand.

A feature of at least one embodiment of the present invention is the provision of a suitable map or the like for magnifying. For the convenience of discussion, the information to be magnified is assumed to be a map. It is intended that this map shall carry all of the necessary information so that when magnified the image is equivalent to a map of a larger scale. Thus, it is not a question of taking a map on the scale of for example 1:100,000 and magnifying it so that it looks to be on a scale of 1:20,000, the invention is concerned with, for example, taking a map already at the scale of 1:20,000, reducing it to a smaller size and printing or impressing it upon a background in such a way that it becomes a finely detailed reduced version of that larger scale map, (not effectively consultable by the naked eye) and thereafter magnifying that finely detailed reduced version so that the apparent image is back to the original size, or thereabouts.

The invention extends to such assemblies whether they are capable of containing one sheet of printed paper or polymer, or of polymer-coated paper, or a roll or a magazine of such sheets (e.g. an accumulation of separate or interconnected sheets) which can be preselected for the area in question.

In a particularly valued form of the invention the printed surface is in the form of a flexible sheet of polymer or polymer-faced material the size and shape of a standard credit card (i.e. approxisately 55 by 85 mm). Such a map on the one hand lends itself to easy storage in conventionally available wallets or similar devices and on the other hand is a shape to partake of a technology of high precision printing upon the polymeric surface, such as used for security purposes on credit cards. There is thus technology available for printing such material at this preferred size, and moreover (as discussed below) there is a ready level of magnification which would give an image of approximately 3× to 8× linear magnification, more preferably 3× to 6× linear magnification to resemble the size of an area of map normally consulted.

The equipment of the present invention is often so constructed that the sheet of material e.g. the credit card-sized sheet of polymer, is mounted for viewing by incident light. However, the invention also extends to embodiments which use transmitted light. Such light may be provided by simple bulbs, by electroluminescent strips, betalights, etc. We have found that for consultation of a map or similar depiction incident light is usually sufficient even at magnifications of about, for example, 5×. For reasons discussed in more detail below, this leads to a longer lifetime of the high-precision printed sheet.

The invention can also extend to the provision of relief maps in the zone in question. Other types of maps or similar printed articles can also be utilized e.g. for use underwater and at night.

The magnifying lens is preferably a simple lens. However, the invention also extends to optical viewing systems with more than one lens. In a preferred embodiment, as discussed in more detail below, the lens is supported on a tilting framework above the map, and in others it is supported upon a slidable or other frame.

Although the lens can be variously configured and can be simple or complex, we have found in most preferred embodiments that a lens can be best utilized within a linear magnification of between 3× and 8×, more preferably 3× to 6×, and preferably at about 5× . A typical lens diameter is about 10–30 mm. The lens moreover can be of any magnifying configuration but is preferably planoconvex, with the flat side closer to the eye of the viewer. It can however be biconvex, with a relatively flatter side outwards. Such a lens gives adequate magnification without undue distortion (especially in certain preferred embodiments of the invention as discussed below) and is suitable to increase the apparent size of any image printed in the convenient credit card-format and expanded to a convenient size for concentration.

Preferably, the viewer is configured so that the map or the like is held in a viewing plane which is somewhat constrained as to overall vertical distance from the lens. Too close a plane gives a blurred image, as does too far a plane. For a lens of the preferred magnification and diameter given above, the optimum plane should be adopted within usually ±5 mm. For this reason a preferred viewing plane is curved. Moreover, some expedient such as selective moveability of the card or (preferably) selective tiltability of the lens is much to be preferred since then all parts of the map or the surface of e.g. credit-card size can be scrutinised with optimum clarity and uniform magnification.

The assembly can be embodied in a number of different wearable forms. For example, it can be located on the back of a glove or mitten in a folded down position, and can be lifted into a viewing position with the other hand.

However, since gloves or mittens are themselves specialised articles of commerce, it may be easier to provide the map as part of a detachable unit upon or around the arm of a wearer.

One form of this envisages a form of detachable resilient cuff made for example of synthetic polymeric material and providing in its structure slideways whereby an upper and magnifying portion of the cuff can be slid upwards to the requisite distance above an underlying printed map. Such a device can be incorporate other features such as a digital watch in a suitable location in the cuff. Indeed, the combination of a map and other usable items, such as clocks, thermometers, barometers, alarms, compasses and the like is a feature of the present invention.

The assembly can be otherwise applied to elements of a user's protective clothing, provided that however it is arrange so that it is readily accessible for viewing. For example, if it is not located on the arm or the hand it could be embodied as a smooth wallet or container to be worn dependent upon a neck chain or in a pocket. This is not absolutely fixed in relation to the body but is regularly reachable and accessible for viewing without the necessity of removing it from the head of the wearer and over any protective headgear.

It is envisaged according to some embodiments of the invention that the structure shall be such as to be readily operable by a gloved hand. In many outdoor sports protective clothing of more or less cumbersome nature is worn, and in particular gloves or mittens are worn for skiing. As indicated above, it is not always practicable to remove these and manipulate a conventional map, and it is envisaged therefore that in some of the detailed embodiments, the invention can, by simple movement of a gloved hand, be placed in a viewing condition.

Three specific embodiments of the invention which present themselves particularly for consideration are as follows.

In one preferred embodiment there is provided a resilient cuff containing on an upper face the assembly, in which the magnifying lens is formed of transparent rigid synthetic polymeric material and possesses two downwardly extending legs slidable in sides of the cuff so as to be movable from a lower to an upper position in relation to the map plane.

The "legs" may provide a modicum of protection in use, again rain or snow, on the detailed map.

In another particulary preferred embodiment the invention is embodied as a synthetic polymeric structure having a support plane which is flat or arcuate e.g. part-cylindrical in contour, and two upwardly foldable portions hinged to either side edge of the support plane and carrying at their free ends a lens spaced from the support plane and from any map supported thereon. Preferably the foldable portions are hinged both where they meet the support plane and the lens, so that the lens can be tilted to focus upon any portion of the support plane, thus avoiding distortion, of scale or otherwise. The foldable portions again provide a modicum of protection against weather.

The support plane may be defined by the respective upper edges of parallel ribs on a base structure, and be continued into a wall portion of the said base as a retaining groove. Such a base structure may possess a transverse rib at one end including an entry slot to locate the area of surface to be examined. One of the upwardly foldable side portions can itself possess a transverse slot to accept the area and position it for rib entry slot.

In a third embodiment the invention is embodied as a smoothly contoured wallet or like container having a lid which is readily manipulable to an outward position and carrying a viewing lens, optionally biased to move out to a viewing position spaced above the case, the body of the case carrying a support for a suitable high detail map. Within the volume there can possibly be electrical circuitry selectively operable to provide indication of time, temperature, barometric pressure, elapsed time, alarm situations, compass bearing or the like. The wallet is preferably smoothly contoured with a large operating button for opening purposes and an equivalently large operating button for selection of the desired displayed parameter.

The preferred embodiments, as discussed in detail above are conveniently such that the detailed depiction of the map or the like is provided in a credit card size and format. The technology of printing in high precision upon credit card-sized polymer coated substrates is already known and can be utilized in the production of the equipment according to the invention. Most preferably, the map or chart information is printed on one face only, with indexing or other information on the obverse, either at normal size or for magnification, or in a mixture. Moreover, and as already indicated in general terms, the lens is preferably from 3× to 8× e.g. about 5× in linear magnification, and is preferably planoconvex with the curved side inward to the depiction. A lens of 5× magnification would imply a focal length, in accordance with the formula $$\text{MAGNIFICATION} = \frac{1000}{4 \times \text{FOCAL } LTH} + 1$$

or about 62 mm.

Certain further advantages, not hitherto achieved, flow from the choice of parameters proposed above, and lead to improved use and working lifetime of the assembly. As any user of maps will be aware, there is a tendency for maps to deteriorate in use, whether this is due to mechanical folding and unfolding or whether it is due to the incidence of rain-and snow upon the surface. The maps as utilized in the present invention are individually of small printed size, so that the problems of folding and unfolding are overcome. Moreover, although finely printed they are typically protected both in periods of use and in periods of non-use. In periods of use, the sides of the viewer, extending up to either side of the map, provide a modicum of protection. If the map is viewed in incident light the viewers head, more or less vertically over the map, gives further practical protection. The case or structure is then only opened to view the map in a location relative to the user such that the map and its fine detail printing are effectively protected. Even if the map is viewed in incident light the finger overlap with the top side edges, especially with a gloved hand, provides useful weather protection. Moreover, such protection in use is united with suitable protection in periods of non-use; the problem of loss of detailed depiction on the map is still present if the map were allowed to abrade against the inner surface of, for example, a pocket of a garment. In accordance with the invention the structure of the viewer is such as to fold over and protect the surface of the map and the fine printing upon its surface.

It is moreover a general advantage that, by providing maps in readily consultable form, the tendency to check on the map is increased and the safety of the user is thus enhanced.

DETAILED DESCRIPTION OF THE DRAWINGS

The invention will be further described with reference to the accompanying drawings, which show numerous embodiments of article showing in each case a map and map reading assembly of the general nature set forth above.

DETAILED DESCRIPTION OF THE INVENTION

Figure 1:
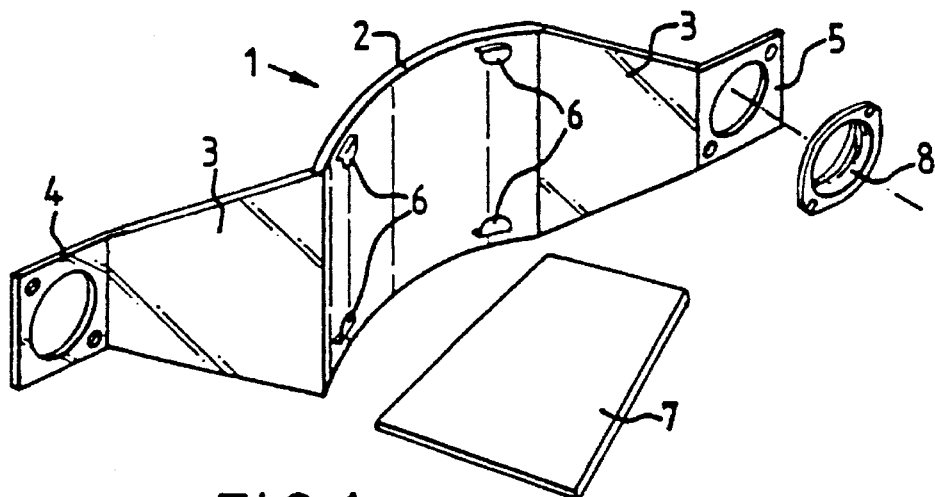
FIG. 1 shows in disassembled form a first embodiment of the present invention.

FIG. 1 shows in opened and exploded form the essential components of a first embodiment of the equipment in accordance with the present invention.

Integral molding 1 comprises a base or mounting 2, side walls 3, and a pair of lens mounting components 4 and 5. The base mounting 2 includes retaining lips or clips 6, and is in a preferred embodiment of the general size and shape of a conventional credit card.

Other features of the assembly are a stack of printed maps 7, each of which is of credit card size and shape, which are intended to be held jointly under the clips with the depiction of the uppermost map visible.

As explained above, the depiction on the map is printed in high precision so that when magnified it gives an image which is that of a portion of a conventional map of the usual scale for some outdoor activity, such as walking, skiing, cycling, etc.

In the embodiments shown the assembly is completed by a planoconvex lens 8. Other magnifying lenses are however also possible, especially biconvex lenses with a relatively flatter outer face.

Figure 2:
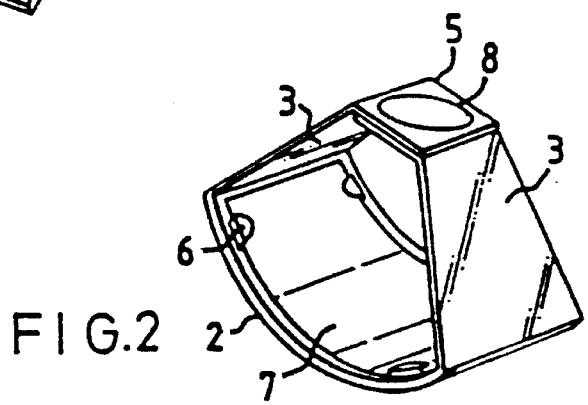
FIG. 2 shows in perspective view the assembled embodiment of FIG. 1.

FIG. 2 shows the assembled elements of FIG. 1.

The lens 8 is installed with its flat side outwards. There is thus constituted a viewer with a curved base and with protective side walls 3 such that if the viewer is used in outdoor conditions and in incident light upon the map 7, the combination of the protective side walls 3 and general protective environment occasioned by the user looking downwards through the lens is such that the exposed map is sheltered to some extent against the effect of weather.

Figure 3A:
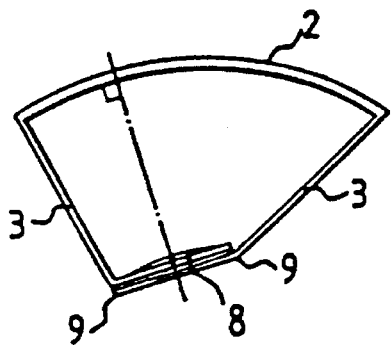
FIGS. 3a and 3b show diagrammatically a preferred optional feature of assembly in the embodiment shown in FIGS. 1 and 2.
Figure 3B:
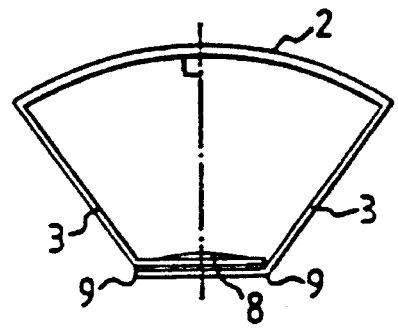

FIGS. 3a and 3b show diagrammatically an important modification of the viewer as shown in FIG. 2. In the viewer of FIGS. 3a and 3b the lens mount is so arranged as to be hinged at its side edges 9. Because of this it can be manipulated in use so that it always perceives the map, upon the curved base, essentially at right angles. By this configuration two sources of potential error are removed. Firstly, spherical aberration, by which areas seen obliquely through a lens have different and distorted appearance from areas seen orthogonally through a lens, is avoided. Secondly, difference of effective distance of the lens from the map is also avoided, which can lead to difference in magnification and thus difference in the apparent scale or distance as perceived by the user.

For a map depiction of the size of a credit card a 25 mm diameter lens can be fabricated with a 5× linear magnification so that, without spherical or other distortions of scale, a detailed map can be viewed of an apparent size of approximately 25 by 40 cm, and at an apparent distance of inspection of about 30 cm or thereabouts.

This in itself is probably somewhat larger than necessary for detailed one-off connection. However, if the viewer is itself used by someone wearing goggles or spectacles, who cannot therefor move his eye to be closely adjacent to the lens then (even though the field of view may be constrained by e.g. the lens surround) the effective patch viewed is still of adequate size.

Figure 4:
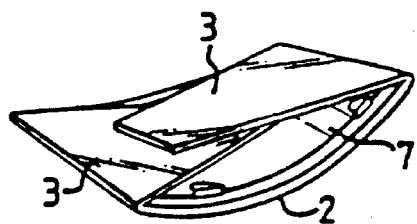
FIG. 4 shows the embodiment of FIGS. 1 to 3 in folded form.

FIG. 4 shows a further configuration of the map shown in FIGS. 1, 2 and 3. As described above, when the map is in use there is a modicum of protection of the finely printed surface against the weather. Likewise, when the map is folded up as shown in FIG. 4 the hinges 9 can permit the lens to lie between the two sides walls, and the side walls jointly cover at least a major proportion of the map surface. Thus, the viewer when put away into a garment pocket is still protected both as to the lens and in terms of map degradation.

Figure 5:
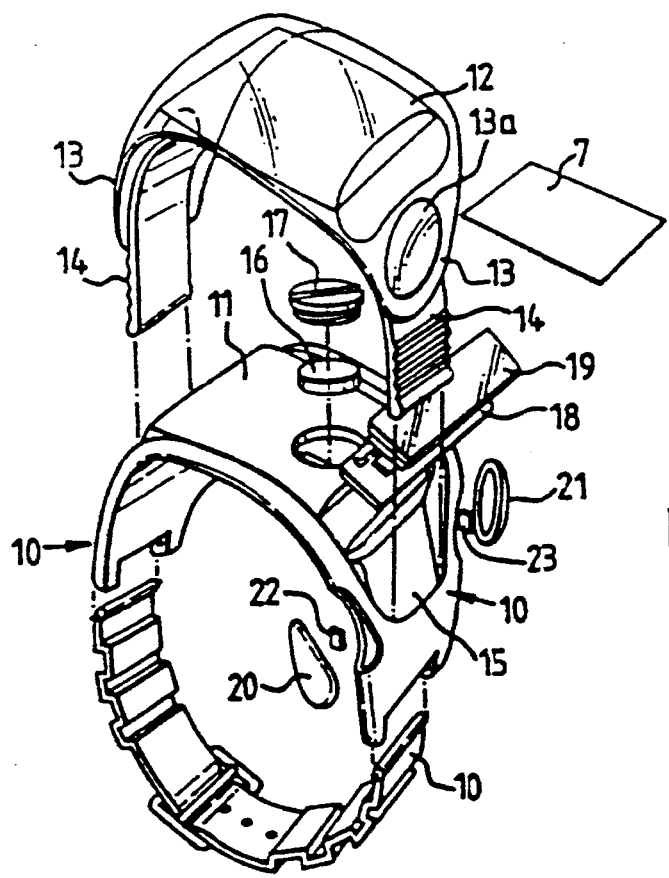
FIG. 5 shows a different embodiment of the invention in exploded view, in the form of a cuff or bracelet.

The essential features of the present invention can however be embodied in a totally different shape. Thus, FIG. 5 shows in exploded form a totally different embodiment of the invention in the form of a bracelet or cuff. In this embodiment, a relatively broad bracelet or cuff 10 defines an upper mounting surface 11 to receive, as before, a small map printed in high precision, preferably of the general size of a credit card. The cuff continues around the wearer's arm, in a conventional form for uniting by a buckle or clip. If desired it can be a simple resilient gripping cuff. The uppermost surface of the cuff is constituted as a lens 12 with side members 13 which can be recessed at 13a to form suitable finger and thumb grips. This element slides within suitable recesses in the sides of the cuff, by by virtue of tongues 14 which cooperate with recesses 15. It will be appreciated that the effective width of the tongues 14 can be if desired the same as that of the map, e.g. by extending the width of the cuff to either side of the map.

The device as shown operates as a viewer under incident light by the user pulling the lens 12 up away from the map and looking down through the lens onto the map surface. As before, the side walls of the viewer sub-assembly provides some form of protection against the weather, and the fact that the user looks down through the lens is again a further protection in use of the precision-printed map surface.

Configuration of the invention in the form of a cuff as shown in FIG. 5 allows further elaboration of the device. For example, it is possible to incorporate in a recess in the cuff, for example beneath the holder for the maps, a conventional small battery and to recover this battery with a simple removable lid. Such a battery can then be utilized to run a digital timer 18 covered with a suitable transparent face 19. If desired, other electronic functions can be incorporated. The general nature of the cuff lends itself to the provision of operating buttons on either edge face, e.g. as shown at 20 and 21 in exploded form to operate microswitches 22 and 23 within the cuff. A suitable design of buttons will permit use even with the encumbrance of gloves or mittens when engaged in outdoor activity.

Figure 6:
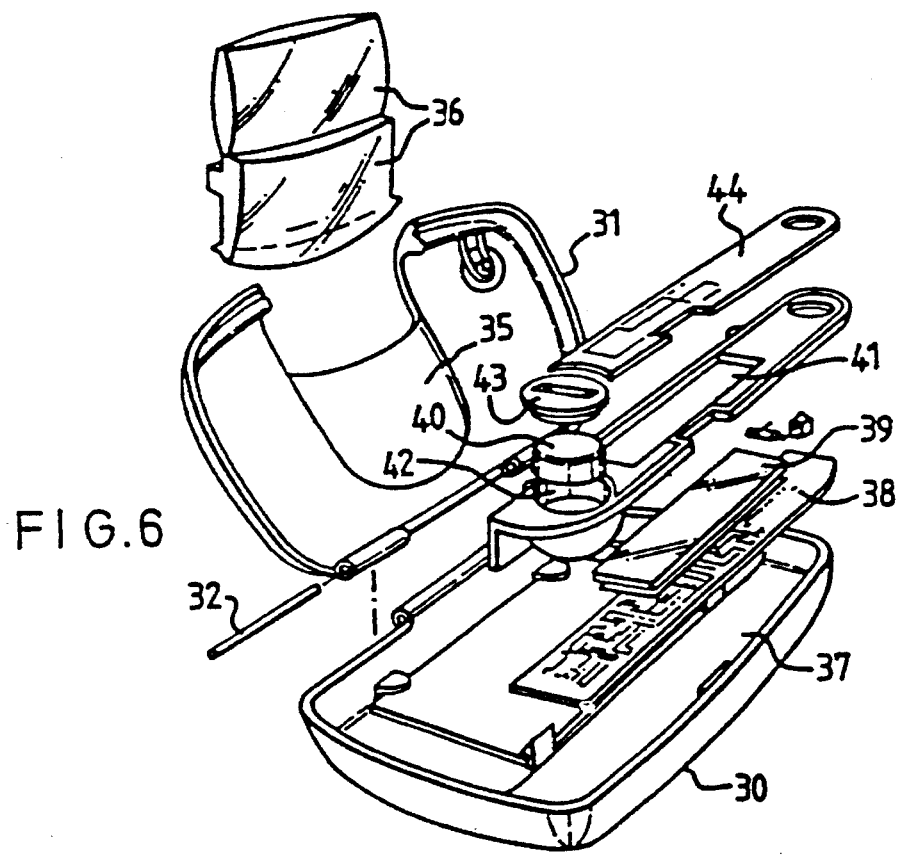
FIG. 6 shows an exploded view of a further embodiment of the invention.

A yet further embodiment of the invention is shown in FIG. 6. This has a totally different appearance, but possesses the essential features of the embodiments as set forth in earlier figures. It is provided in the form of a wallet 30 with a lid 31 hinged together at 32 and enclosing, in a major part of its interior volume, a stack of suitable precision-printed maps 33 of the general nature as discussed above, held in place by clips 34. The lid is recessed at 35 to hold a suitably configured polymeric lens 36, 37 under biasing conditions such that, when the box is opened, the lens biases outwards to locate at a suitable viewing distance over the maps.

The minor portion of the container, at 37, could be empty but can alternatively include a printed circuit board 38, programmed to operate upon a liquid crystal display 39, driven by a battery 40. The battery is held in a suitable holder unit 41, within recess 42 covered by a lid 43. The whole unit provides a window for viewing the liquid crystal display, by means of a membrane 44 of transparent polymer. As is known in the electronic art, suitable sensors may be provided responsive to temperature, humidity, and other meteorological qualities in addition to a conventional time display and possibly compass reading.

The features listed as locating in the minor portion 37 of the wallet are of course ancillary to the general nature of the invention as discussed above, which is again concerned with the provision of a polymeric or like card substrate of the size of a credit card held in a relatively protected environment in period of non-use and viewable by incident light under relatively protected conditions in a period of use to give an image of a conventional usable size.

The embodiment of FIG. 6 could be modified by including within the wallet an erectable framework as in FIG. 1, using the inside of the lid as a suitable storage space for a supply of maps. If desired, a translucent screen could be provided in the wallet for use with transmitted light. The wallet cover, if uppermost when the viewer is in use, protects against rain or snow.

Figure 7A:
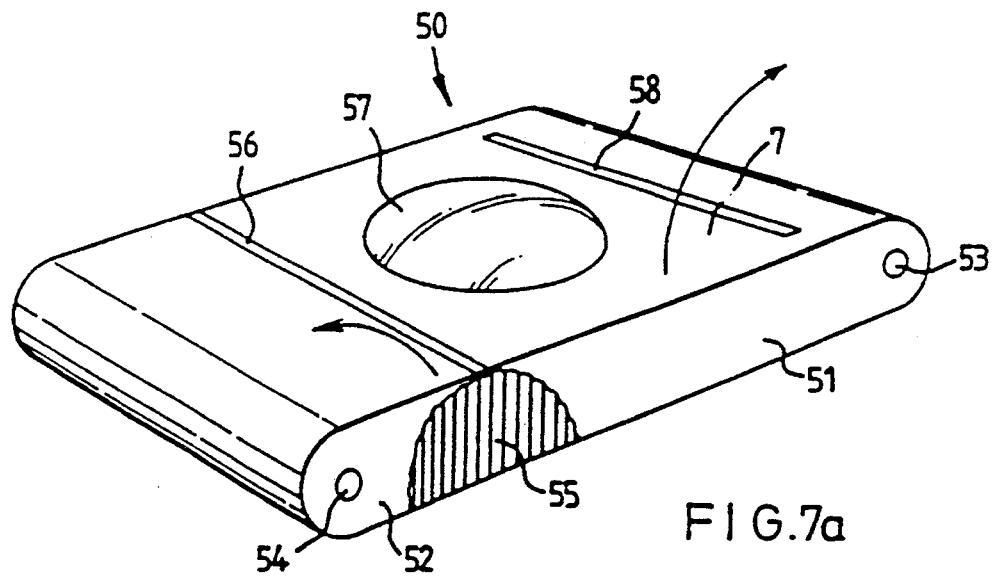
FIG. 7a shows in perspective view, a further embodiment of a viewer according to the invention folded up for storage or transport.

FIG. 7a shows a case 50 which comprises two upwardly foldable portions 51 and 52 journalled at 53 and 54 respectively. The shorter portion 52 is provided with a ribbed regions as at 55 to assist gripping and pivotal opening. At the upper face of the closed case 50 is the parting line 56 between the two portions 51 and 52 and, a domed region 57 and slit 58 both from portion 51.

Figure 7B:
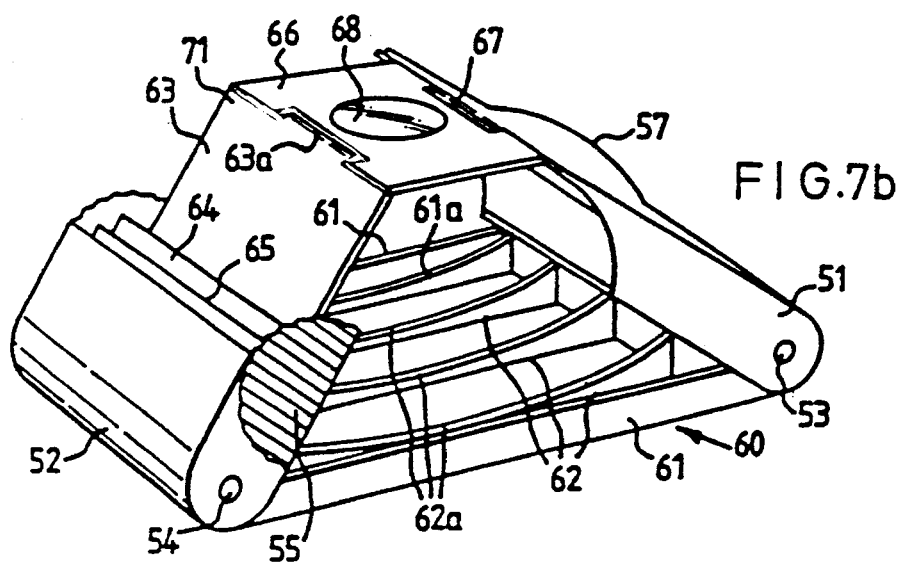
FIG. 7b shows in similar perspective view the embodiment of FIG. 7a, opened for use.

FIG. 7b shows the same device when opened ready for use. No viewing member is shown in order that the structure of the device can be more readily understood. The device comprises a tray or base 60 with side walls 61 and internal ribs 62 parallel to the walls. Each rib has an upper surface 62a and these upper surfaces are curved to define a common curved support plane. The inner faces of the sidewalls 61 are grooved at 61a in continuation of the same support plane.

The portion 52 is continued forward by a planar support leg 63, terminating in a hinge structure at 63a, discussed in more detail below. The planar support leg 63 joins the upper surface of end portion 52 over steps 64 and 65 respectively. In this embodiment the viewing support or mounting consists of a plate 66, hinged at 63a and similarly hinged at 67 to the respective foldable portion 51 and 52. The plate 66 carries planoconvex lens 68 with, as shown in FIG. 7b the flat side 68a uppermost. As discussed above, other types of lens can also be used.

Figure 8:
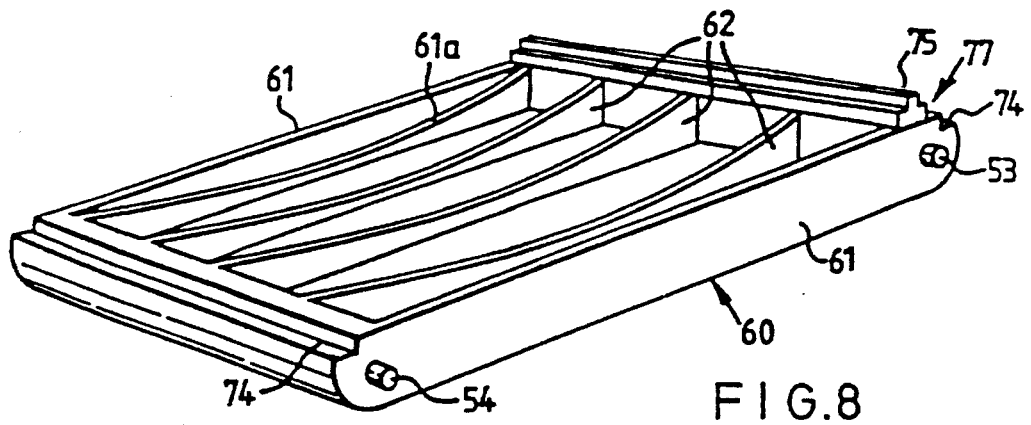
FIG. 8 shows the base portion of the embodiment shown in FIG. 7b.

FIG. 8 shows base 60 with side walls 61 internally grooved at 61a and ribs 62 with curved upper edges 62a. Transverse end rib 75, described in more detail below, includes transverse feed slot 77.

Figure 9A:
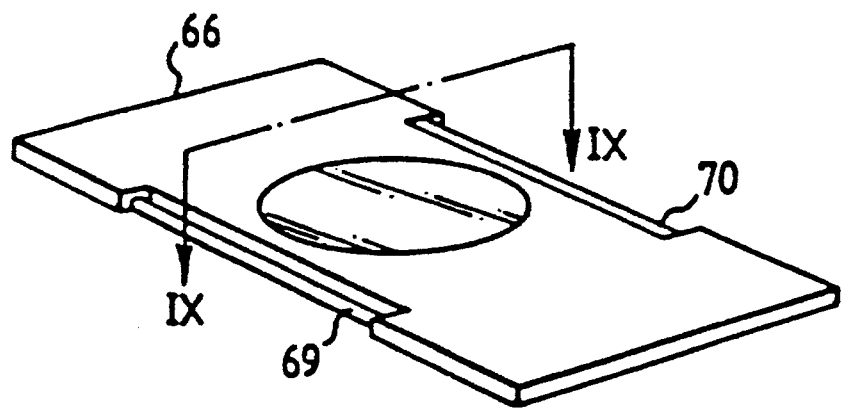
FIG. 9a shows a plate mounting a viewing lens, and one possible form of hinge connector from such plate to adjacent supports.

The exact nature of the mounting of the lens and the plate is more apparent from FIG. 9a. The plate 66 is rectangular in nature and carries at each side a hinge pin 69 and 70 respectively, for cooperation with hinges 63a and 67.

Figure 9B:
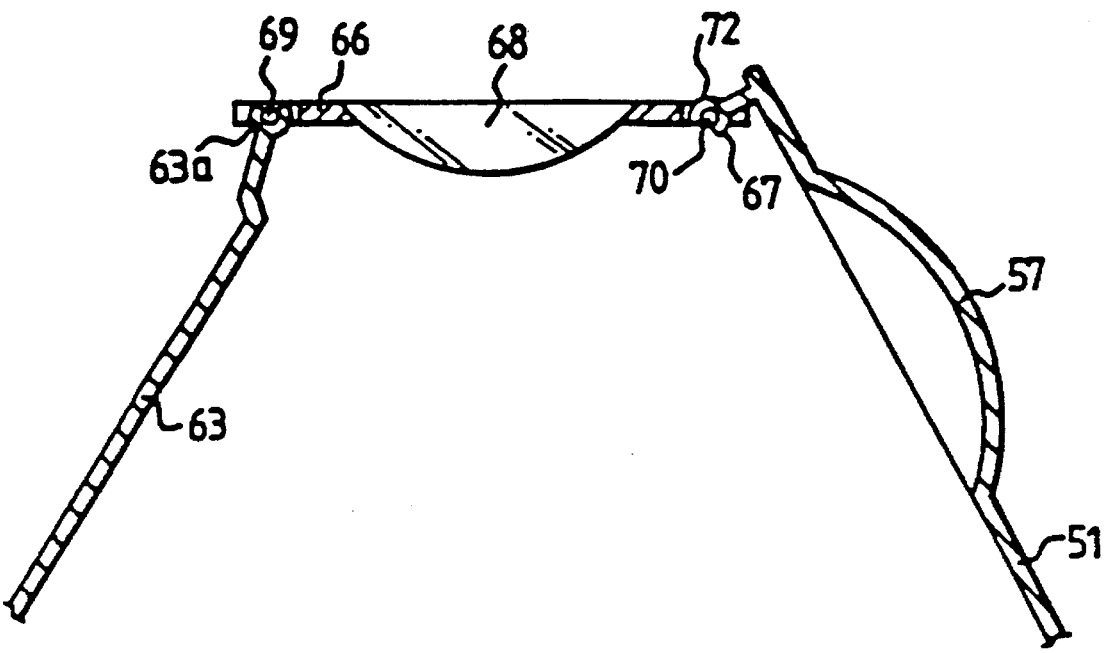
FIG. 9b shows in section along line IX—IX of FIG. 9a the plate and its connections to the adjacent supports.

FIG. 9b shows in more detail the configuration of the hinge structures. Hinge member 63a clasps pin 69 and is mounted at the end of a terminal region 71 lying in a plane at a slight angle to that of the support leg 63. On the other support member 51 the hinge structure 67 is located at the end a wall 72 extending from the outer surface of the support 51.

Figure 10A:
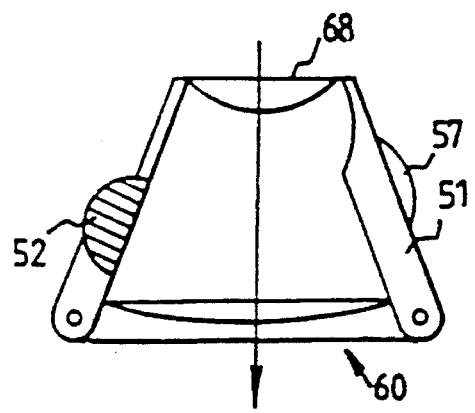
FIGS. 10a, 10b and 10c show diagrammatically the device shown in FIGS. 7a and 7b with the lens oriented in different viewing positions.
Figure 11A:
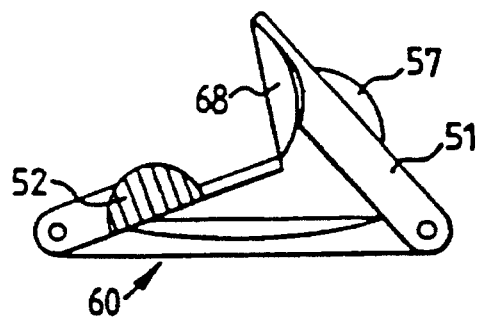
FIGS. 11a and 11b show the device shown in FIGS. 7a and 7b, respectively partly folded and completely folded.
Figure 11B:
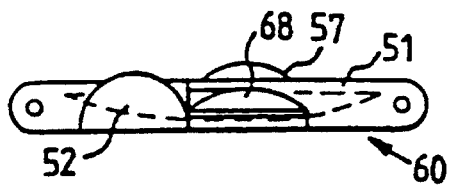

While details of the invention such as the hinge structure can obviously be varied within the scope of the claims of this application, the hinge structures as shown provide an example for ready use as shown in FIGS. 10a, b and c and in FIGS. 11a and 11b.

Figure 10B:
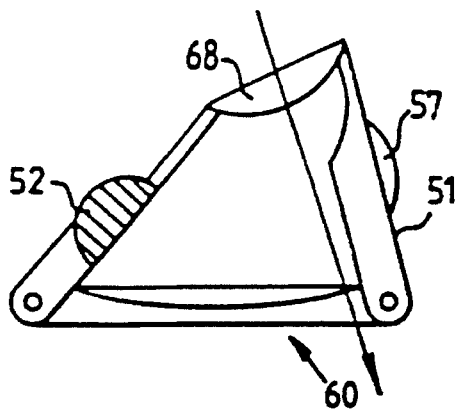
Figure 10C:
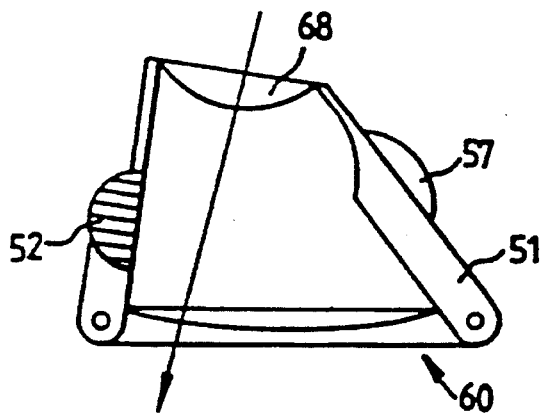

FIGS. 10a, 10b and 10c show diagrammatically the orientation of the equipment firstly when the center of the viewing surface is being examined; secondly when one of the two end regions is being examined; and thirdly when the other of the two end regions is being examined. In each case the distance from the lens to the viewing surface is essentially the same so that accurate magnification, without the blurred images that come from the viewing surface being either too close or too distant, is achieved. Thus a planoconvex lens of a size suitable for use by a lay user can be used for accurate inspection of a field of view larger than the static field of view as would he obtained, for example, in FIG. 10a if no hinges 63a, 67 were provided.

FIGS. 11a and 11b show how the structure shown in FIGS. 10a, 10b and 10c can be folded up for transport or storage. The shorter portion 51 is pushed downwards. The hinge structure 63a thereon is of such a nature that the plate can invert and arrive with its convex surface within the domed portion 57 and the flat surface of the lens lying safely within the case. In practice this latter is spaced above the plane of leg 63 of the foldable portion 52.

Figure 12:
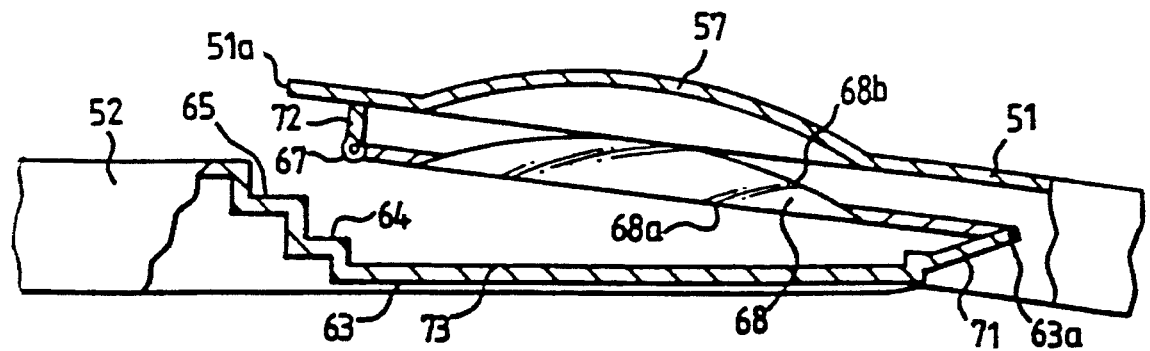
FIG. 12 is a section of part of the device as shown in FIGS. 7a and 7b, in a position in which it is almost closed for storage.

FIG. 12 shows in more detail the folding arrangements in the region of the lens, whereby the lens is protected during periods of non-use and transport.

As indicated above, the planar leg 63 terminates in steps 64 and 65 before it joins the level of the foldable portion 52. Au the device is folded, hinges 63a and 67 jointly operate so that the lens 68 becomes accommodated within the domed region 57. When the device is fully closed, the endmost edge 51a of the end member 51 locates on step 65. The hinge 67 and its support rib 72 locate on step 64. Thus, the flat surface at 68a of the planoconvex lens is spaced above the surface 73 of the planar support extension 63 so as to preserve it from scratching and contamination. It can equally well be arranged that the curved surface 68b of the lens is similarly spaced by a small amount from the inside of the domed portion 57.

Figure 13:
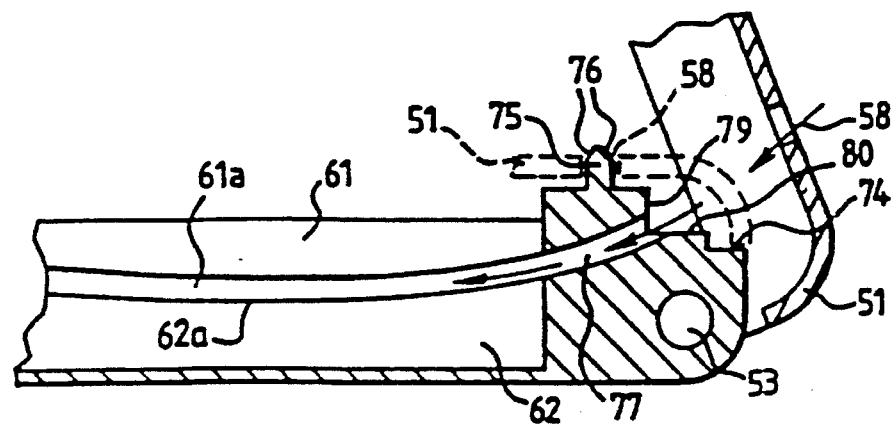
FIG. 13 shows a partial section of one end of the device as shown in FIGS. 7a and 7b, when open for use.

FIG. 13 shows in detail a medial section of the end region of the tray, with the portion 51 shown diagramatically. As also shown in FIG. 8, the end regions of the tray are recessed at 74 and the end wall of the tray is provided, adjacent to the hinge 53 with an upstanding transverse rib 75, slightly chamfered at its upper corners 76 (see FIG. 13) and slotted at 77. The slot 77 lies in continuation of the curved plane defined by the upper faces 62a of ribs 62 and by the groove 61a in the side walls 61. The configuration is such so that the slot opens both into vertical face 79 and into horizontal face 80 of rib.

As shown in FIG. 13, when the foldable portion 51 is erected to support the lens the slot 58 therein lies in a continuation of the general curved plane defined by the edges 62a and the groove 61a. Thus, a credit-card-sized sheet to be examined can be fed through the slot 58, thence in through the opening to the slot 77, and onto the curved plan defined by the edges 62a. The marginal edges of such a card are held at 61a. Since slot 77 opens into both the horizontal face 80 and the vertical face 79 the leading edge of the card being inserted is guided into the slot 77 for easy loading. Exact positioning for this can if desired be achieved by a 'click' fastening at the correct opening position.

Slot 58 is moreover so positioned that when the portion 51 is closed the slot accommodates the transverse rib 75 (being led thereto by the chamfers 76) whereby the closed container is again safeguarded against ingress of dust or other potentially damaging material.

While the Applicant does not intend to be bound by any theory as to the operation of his invention he has established as a matter of experimentation that there are design constraints on an optical viewer as shown in FIGS. 7 to 12, to be used for examination of a map or the like.

A large conventional handheld magnifying glass of say 100 mm diameter gives a large clear field of view but not particularly high magnification. It is suitable for scanning large areas, for example of print, but it is not suitable for higher magnification over a smaller area.

On the other hand, the use of a small eyepiece lens, such as a microscope eyepiece of 3 mm diameter, for example, is not always acceptable to lay users and needs a modicum of experience.

However, simple use of a lens of intermediate dimensions between about 15 and 40 mm diameter, while convenient to the eye is again difficult for many purposes.

Firstly, the depth of clear magnification is not great. That is to say, the article to be examined must lie within a relatively small range of distances from the lens. In the case of the present invention, using a lens of about 20 cm diameter with a magnification of about 5× a variation of a few millimetres in the distance from the lens to the object gives not only a difference in magnification but a significant loss of clarity, whether because the lens is too close (so that the loss of clarity is due to the non-optimum distance of the image from the eye,) or whether it is too far. Thus there is a constraint upon the distance from the lens.

There is also a related constraint upon the useable field of view. In particular, using such a lens as described by way of example, the clearest field of view is not much greater than a circle of 50–60 diameter on the card or other viewing surface.

Hitherto this has been no problem. For a conventional slide viewer the 35 mm maximum slide dimension fits comfortably within the area of accurate viewing of a simple lens system. Larger film formats indeed use differently constituted viewers.

Similar considerations arise with postage stamp viewing. For simple lens systems such as jewellers loops, or small botanical magnifying glasses, the desired field of view is similarly small. However, when closely viewing precision-printed maps (for example) a magnification of 3, 4 or 5× would only be sufficient to give a clear field of view equivalent to an area which would be up to a maximum of 250 mm or so in diameter on a full sized map after magnification and might be less. This in itself would carry only a small amount of total information and not be practical as a separate viewing card.

The present invention therefore provides constraint on the viewing distance and provides some means enabling a zone of accurate magnification to be selectively inspected from a somewhat larger, but still readily handleable, unit. Typically, it allows all parts of a credit-card sized map or plan e.g. a subway plan to be inspected and accurately read even by a lay user. In the preferred embodiment this is done by a tilting arrangement of the lens and by holding the viewing card in for example a suitable curved constrained plane correspondingly, but other expedients could be adopted which involve a stationary lens and selectively movable map areas of small overall physical dimension but nonetheless larger than the field of accurate magnification for a static lens of magnification 3 to 8× and diameter say 10 to 40 mm.

The invention has its origins in upon a careful selection of characteristics of (a) user-friendly simple optics, (b) small scale viewing areas with high precision printing or otherwise imparted information upon them, and (c) means for constraining the areas both as to distance from the lens and as to selective inspection of the different parts of the viewing areas for a maximum accuracy and clarity of magnification.

I claim:

1. A viewer for use with at least one substantially rectangular card which has on at least one face thereof information which has a character or feature size distinguishable by the eye only under magnification, the viewer comprising:

a support base adapted to support at least one information card in a first curved plane, the support base having two opposed elongated side edges and two opposed short side edges;

two side portions each having opposed upper and lower edges, each side portion being connected at a respective lower edge to a short side edge of the support base by a respective first hinge; and a magnification viewing lens mounted on the upper edges of each side portion by a second hinge, the first and second hinges being parallel to each, wherein the side portions are pivotal about the first hinges and the viewing lens is pivotal about the second hinges, such that the lens moves in a second curved plane corresponding to the first curved plane and with respect to scan a card supported in the support base.

2. The viewer as claimed in claim 1, wherein the viewing lens is of a magnification in the range of 3× to 8×.

3. The viewer claimed in claim 1, wherein the side portions being pivotable about the first hinges and adapted to extend outwardly from the support base to hold the lens at a first position spaced from the support base whereby the user to the viewer can view a portion of the card through the lens, the side portions being further pivotable about the first hinges to cause the lens to tilt about the first position to enable the user to select and to view other portions of the card, and the side portions being further pivotable about the first hinges to lay generally parallel to the support base and thereby to move the lens to a storage position close to the support base, one of said side portions covering the lens when in the storage position.

4. A combination comprising:

(a) at least one substantially rectangular card which has on at least one face thereof information which has a character or feature size which is distinguishable by the eye only under from three to eight times linear magnification, and only under from three to eight times linear magnification, and (b) a viewer including;

a holder having a rectangular support base adapted to support at least one card in a first curved plane, the rectangular support base having two opposed elongated side edges and two opposed short side edges, two side portions each having opposed upper and lower edges, each side portion being connected at a respective lower edge to a short side edge of the rectangular support base by a respective first hinge, and a viewing lens of linear magnification from 3× to 8× being mounted on the upper edges of each side portion by a second hinge, the first and second hinges being parallel to each other, the side portions being pivotal about the first hinges and adapted to extend outwardly from the rectangular support base to hold the lens at a first position spaced from the rectangular support base whereby the user of the viewer can view a portion of the at least one card through the lens, the side portions being further pivotal about the first hinges to cause the lens to move in a second curved plane corresponding to the first curved plane and relative to the support base from the first position to enable the user to select and to view other portions of the at least one card, and the side portions being still further pivotal about the first hinges to lay generally parallel to the support base and thereby to move the lens to an inner storage position close to the rectangle support base, one of said side portions covering the lens when in the inner storage position.

5. The combination as claimed in claim 4, in which a plurality of cards is provided, and the cards are supported in a stack on the support base.

6. The combination as claimed in claim 4, in which the card is about 55 mm by 85 mm in size.

7. The combination as claimed in claim 4, in which the card is viewed through the viewing lens by incident light.

8. The combination as claimed in claim 4, further comprising a light source for illuminating the at least one card.

9. The combination as claimed in claim 4, in which the lens is a planoconvex lens with a curved side facing towards the support base.

10. The combination as claimed in claim 9, in which the lens diameter is from 10 mm to 40 mm.

11. The combination as claimed in claim 4, in which the lens is a biconvex lens, with a side of greater curvature facing towards the support base.

12. The combination as claimed in claim 11, in which the lens diameter is from 10 mm to 40 mm.

13. The combination as claimed in claim 4, in which the lens has an optimum viewing distance and the support base supports the card at a distance from the lens equal to the viewing distance ±5 mm.

14. The combination as claimed in claim 4, in which the support base comprises a plurality of parallel ribs.

15. The combination as claimed in claim 14, in which the support base has a transverse rib at a short side edge thereof, the rib having an entry slot for feeding the at least one card onto the support base.

16. The combination as claimed in claim 15, in which one of the side portions has a transverse slot which is aligned with the entry slot when the said one side portion is pivoted outwardly.

17. The combination as claimed in claim 16, in which the side portion transverse slot fits over and is closed by the base structure transverse rib when the respective side portion is pivoted to lay generally parallel to the support base.

18. The combination as claimed in claim 4, wherein the card is flexible, and the support base supports and holds the card in a curved plane.

19. A viewer for viewing under magnification a rectangular card which has a shorter dimension and a longer dimension, the viewer comprising:

a support base having opposed short sides corresponding to the shorter dimension of the card and opposed elongated sides corresponding to the longer dimension of the card, the support base adapted for supporting the card for viewing in a first curved plane, a viewing lens of linear magnification between 3× and 8×, two side portions, each side portion having opposed first and second ends and each side portion being pivotally connected by a respective first hinge at the respective first end thereof to a short side of the support base and being pivotally connected by a second hinge at the second end thereof to the viewing lens, the second hinges being spaced apart and the first and second hinges being parallel to each other, the side portions being pivotal between a first position extending in a direction away form the support base and a second position generally parallel to the support base, wherein when in the first position the lens is held generally parallel to the support base and magnifies a portion of the card, and the lens is adapted to move in a second curved plane corresponding to the first curved plane and with respect to the support base from the first position by pivoting movement of said side portion to enable a user to scan across the card in the direction of the longer dimension, and in the second position the lens lays generally parallel to the support base and is covered by one of the side portions.

20. A viewer as claimed in claim 19, wherein the support base is arcuate in the direction of the elongated sides.

21. In combination, the viewer of claim 19, and a card, wherein the card is approximately 55 by 85 mm in size and has on one face thereof information in the form of a map, and wherein the information has a character or feature size which is distinguishable by the eye of a user only under at least 3× linear magnification.

22. A viewer as claimed in claim 19, wherein the support base is generally rectangular in shape.

23. A viewer as claimed in claim 19, wherein when the lens is in the first position, the portion of the card being magnified is a portion extending substantially fully across the card in the direction of the shorter dimension of the card and only part of the way along the card in the direction of the longer dimension of the card.

24. A viewer for viewing under magnification a rectangular card having a shorter dimension and a longer dimension, the view comprising:

a rigid rectangular support base having opposed long sides and opposed short sides corresponding respectively to the longer and shorter dimension of the card, a rigid view lens of linear magnification between 3× and 8×, two rigid side portions, each hingedly connected at opposite ends thereof to the viewing lens and the short sides of the support base, and adapted to form in a first open position a quadrilateral configuration in which the side portions each subtend an acute angle with the support base and an obtuse angle with the lens, each side portion being shorter in length than the support base, the view lens having a field of view which extends over a portion of a card when a card is supported in a first curved plane on the support base, the portion of the card in the field of view extending substantially completely across the card in the direction of the shorter dimension of the support base and only part of the way across the card in the direction of the longer dimension of the support base, and the side portions adapted to be pivoted by a small amount relative to the support base and the lens to adjust the position and orientation of the lens relative to the support base and move the lens in a second curved plane corresponding to the first curved plane and relative to the support base to scan the field of view of the lens substantially completely across the card in the direction of the longer dimensions of the support base, and the side portions being foldable to a second closed position in which a first side portion lays substantially flat against the support base and the second side portion lays substantially parallel to the support base and the lens is sandwiched between the second side portion and the first portion and base.

25. A viewer as claimed in claim 24, wherein the support base is arcuate in the direction of the long sides.

26. A viewer as claimed in claim 24, wherein a plurality of cards can be stored on the support base when the viewer is in the closed position.

27. The viewer of claim 24, further comprising:

a card, the card being approximately 55 by 85 mm in size and having a map on one face thereof, the map detail being too small for reading by the unaided eye.

\* \* \* \* \*